2,947,606
PRODUCTION OF SILICA-FREE ALUMINA

Francis L. Holderreed, Anaconda, and Robert E. Sullivan, Butte, Mont., assignors to The Anaconda Company, New York, N.Y., a corporation of Montana No Drawing. Filed May 21, 1957, Ser. No. 660,441

5 Claims. (Cl. 23—143)

This invention relates to the production of alumina from iron-containing aluminiferous materials such as bauxite, clay, etc., and has for its object the provision of certain improvements in the process of solubilizing alumina, as sodium aluminate, by sintering with sodium carbonate or soda ash.

Bauxite, the principal ore of alumina (aluminum oxide, $Al_2O_3$), has heretofore been, and is presently, the main source of the high grade alumina (substantially silica- and iron-free) required in the electrolytic aluminum reduction process. Clay has long been recognized as another possible source of high grade alumina, and various proposals have heretofore been advanced for producing such alumina from clays. In clay, alumina is combined with silica ($SiO_2$), generally in the form of a hydrous silicate of alumina (e.g., $Al_2O_3 \cdot 2SiO_2 \cdot 2H_2O$). Clays further contain varying amounts of other constituents, frequently referred to as impurities, such as excess silica, iron compounds, e.g. ferric oxide ($Fe_2O_3$), etc.

The copending application of Frederick Laist, Serial No. 626,916, filed December 7, 1956, describes a process for the production of high grade alumina from an iron-containing clay in two stages of treatment, in the first of which silica is removed and a crude alumina containing ferric oxide is produced, and in the second of which the ferric oxide is eliminated and a high grade alumina is produced. Basically, the first stage treatment involves extraction of alumina from calcined clay by leaching with a dilute (20%) solution of hydrochloric acid to produce a crude alumina substantially free of silica but containing ferric oxide. In the second stage treatment the crude alumina is solubilized as sodium aluminate ($NaAlO_2$), advantageously by the soda-sinter process in which it is sintered at an elevated temperature in the presence of sodium carbonate or soda ash ($Na_2CO_3$) without altering the ferric oxide. The sinter is leached to dissolve the sodium aluminate and the resulting pregnant solution is separated from the insoluble leach residue consisting mainly of ferric oxide. The sodium aluminate solution is appropriately treated to precipitate aluminum hydroxide ($Al(OH)_3$), and the precipitate is calcined to produce substantially silica- and iron-free alumina suitable as feed to the pot line of an electrolytic aluminum reduction plant.

The present invention is particularly concerned with the process steps of solubilizing the alumina in the aforementioned crude alumina by soda-sintering and leaching, but may also be advantageously applied in the solubilizing of other aluminiferous materials by the soda-sinter and leaching process. Because of the theoretically complete removal of silica by the acid extraction process, the aforementioned crude alumina contains only minute amounts of silica adventitiously present; but other aluminiferous materials amenable to the soda-sinter solubilizing process may contain, in addition to iron oxide, small amounts of silica which can be effectively eliminated in the practice of the invention.

Sodium aluminate in an aqueous solution tends to hydrolyze with precipitation of aluminum hydroxide. To the extent that such hydrolysis takes place during the separation of the solution from the insoluble leach residue, the precipitated aluminum hydroxide will be discarded and lost in the insoluble leach residue. In commercial plant practice, an interval of about two hours should be allowed for the necessary solids-liquid separatory steps and clarification of the sodium aluminate solution, and an object of the invention is to minimize the tendency of the solution to hydrolyze during that interval. The invention accomplishes this object by including sodium hydroxide or caustic soda (NaOH) in the sodium aluminate solution during leaching of the sinter. From 30 to 50 grams, and preferably about 45 grams, of sodium hydroxide are included per liter of sodium aluminate solution, in which the $Al_2O_3$ concentration may be from about 100 to about 140 g./l. (grams per liter).

The addition of lime (CaO) to the sodium aluminate solution will not by itself suffice to prevent hydrolysis of the sodium aluminate. However, the sodium hydroxide for doing so may advantageously be formed in situ by leaching the sintered material in the presence of lime and sodium carbonate which react to form free sodium hydroxide and insoluble calcium carbonate ($CaCO_3$). An excess of sodium carbonate is customarily mixed with the aluminiferous material in making up the soda-sinter charge, and such excess is available for reaction with lime to provide the contemplated amount of sodium hydroxide. The lime may be introduced either with the sinter charge or in the course of leaching. When present during sintering lime serves to eliminate any silica in the aluminiferous material by forming an insoluble lime-alumina-silicate, as noted above. The calcium carbonate formed in situ during leaching by the reaction of lime and sodium carbonate is an effective filter aid in the separation and clarification of the sodium aluminate solution from the insoluble leach residue.

In the practice of soda-sintering and leaching of the sinter, the aluminiferous material, preferably ground to nominal 100-mesh (Tyler screen series), is subjected to a sintering heat treatment in the presence of sodium carbonate. The sodium carbonate may advantageously be mixed with the aluminiferous material in the form of a concentrated aqueous solution recovered from the subsequent decomposition of the sodium aluminate by carbon dioxide. Make-up sodium carbonate may be added dry to and mixed with the soda-sinter charge. The sintering operation is preferably carried out at a temperature within the range of 1700 and 1900° F. with a retention period of about one hour at that temperature in any appropriate type of kiln, preferably provided with a pug mill type feeder, cyclone dust collector and return, and product cooler.

In the course of sintering substantially all of the alumina is converted, without fusion, to water-soluble sodium aluminate, while the iron remains in the sinter as insoluble ferric oxide. The sintered product is leached, preferably with wash water from subsequent clarification operations, to dissolve the sodium aluminate, which is separated from the insoluble leach residue by filtration or the like. The reaction during leaching is strongly exothermic and leaching is preferably carried out at a temperature as near the boiling point as practical, and at least above 160° F. The clarified sodium aluminate solution is advantageously treated with carbon dioxide for precipitating aluminum hydroxide since sodium carbonate is thereby regenerated for reuse in the soda-sinter step. The precipitated aluminum hydroxide is dehydrated by calcination at a temperature of 1700–2100° F. to produce a high grade, substantially silica- and iron-free alumina.

The sodium aluminate produced in the soda-sinter kiln has a high degree of water solubility. However, the concentration of sodium aluminate in the leach liquor is preferably maintained within the range of from 100 to 140 (and most preferably about 135) grams per liter of $Al_2O_3$ in solution, since the leach liquor becomes viscous and filters slowly when the sodium aluminate concentration is too high. Sodium aluminate, when dissolved, has a tendency to hydrolyze with the formation and precipitation of aluminum hydroxide which would be lost in the succeeding filtering or other clarifying steps. In accordance with the invention, this tendency of hydrolysis to occur is minimized by carrying free sodium hydroxide in the leach liquor during leaching and during the separation of the sodium aluminate solution from the insoluble leach residue and clarification of the solution. With solutions having a sodium aluminate concentration within the aforementioned range, from 30 to 50 grams of free sodium hydroxide per liter of solution gives satisfactory results. The inclusion of such an amount of free sodium hydroxide in the leach liquor inhibits hydrolysis for a period of time up to about 2 hours, which is ample for separation of the sodium aluminate solution from the insoluble leach residue and clarification of the solution. In practice, very satisfactory results have been obtained by maintaining a free sodium hydroxide concentration of about 45 g./l. (grams per liter) where the sodium aluminate solution as separated from the insoluble leach residue contained about 130 to 135 g./l. of $Al_2O_3$ in solution.

Free sodium hydroxide may advantageously be provided in the leach liquor by including lime (in excess of the amount required to combine with any silica present) and additional sodium carbonate in the soda-sinter charge. The excess lime and excess sodium carbonate come through the sintering operation practically unchanged, and in the subsequent leaching of the sinter, they react to form free sodium hydroxide and insoluble calcium carbonate. The latter is eliminated along with iron oxide in the insoluble leach residue. Alternatively, the lime, or both lime and sodium carbonate, may be introduced into the circuit at the leaching step.

Aluminiferous material which is subjected to soda-sintering to solubilize the alumina and form a sodium aluminate solution from which alumina of pot line grade may be recovered should be substantially silica-free. This is because silica present in the aluminiferous material is solubilized along with the alumina by the soda-sinter treatment, and will carry through into the alumina product. However, it is very difficult, and frequently impossible, to prevent adventitious contamination with silica of the aluminiferous feed to the soda-sinter process. Even atmospheric dust, raised from the ground on a windy day, can lead to significant silica contamination of such material. Moreover, it is sometimes desirable to subject an aluminiferous material containing a small but significant amount of silica to soda-sintering without handling it specially to eliminate its silica content.

In accordance with the present invention a substantially silica-free alumina is recovered from aluminiferous material in which a small amount of silica is present by subjecting such material to a sintering treatment with sodium carbonate in the presence of lime. During the sintering treatment, the silica combines with lime and alumina to form a lime-alumina-silica complex (evidently a calcium aluminum silicate) which is insoluble to any significant extent in water or in alkaline solutions. When the product of soda-sintering in the presence of lime is leached to dissolve the sodium aluminate, any silica originally present remains, in the form of such complex, in the undissolved leach residue.

When lime for reacting with sodium carbonate to form free sodium hydroxide in the leach liquor is introduced at the leaching step, or when the contemplated free sodium hydroxide is not formed in situ in the leach liquor, only such amount of lime as is required to eliminate the silica present in the aluminiferous material is included in the soda-sinter charge. Ordinarily, however, it is preferable to include lime in the soda-sinter charge in sufficient amount to eliminate any silica in the aluminiferous material, and to provide, by reaction with sodium carbonate during leaching, the desired amount of free sodium hydroxide to inhibit hydrolysis in the sodium aluminate solution. An additional advantage of forming the desired free sodium hydroxide in situ, by reaction between lime and sodium carbonate, is that the insoluble calcium carbonate aids filtration of the iron oxide in the leach residue.

Following is an example of the invention as applied to the treatment of a crude alumina produced from an Idaho clay by the acid extraction treatment of the aforementioned Laist application, and analyzing about 84% $Al_2O_3$, about 16% $Fe_2O_3$, less than 0.1% residual chlorine, and negligible silica. In the example the contemplated free sodium hydroxide in the leach liquor was provided during leaching by excess sodium carbonate in the soda-sinter charge, and lime introduced with the leaching charge. Substantially the same result would be obtained by including the same amount of lime in the soda-sinter charge, but with the practically silica-free aluminiferous material there was no particular point in subjecting the lime to the heating of the sintering step. In general, the relative proportions by weight of (1) aluminiferous material (of about 84% $Al_2O_3$ and about 16% $Fe_2O_3$), (2) sodium carbonate, and (3) lime in the soda-sinter charge, are about 1:1.25–1.50:0.2–0.4, where both the lime and sodium carbonate required to provide the contemplated free sodium hydroxide in the leach liquor are included in the soda-sinter charge.

The crude alumina was ground to nominal 100-mesh, and mixed with recycled sodium carbonate solution and make-up sodium carbonate, in the proportion of about 40% crude alumina, 50% $Na_2CO_3$ in recycled solution and 10% make-up $Na_2CO_3$. This mixture was sintered at a temperature of 1900° F. for 1 hour, in the course of which the alumina was converted without fusion to sodium aluminate while iron remained unchanged in the sinter as $Fe_2O_3$. The sinter product analyzed 42.3% $Al_2O_3$, 25.6% $Na_2O$, 23.8% $Na_2CO_3$ (free) and 8.3% Fe, and was ground to nominal 100-mesh. The ground sinter was leached with water (filter wash water) at a temperature of about 210° F. in about ½ hour's time, and sufficient lime was added to the leaching charge to provide 45 g./l. of sodium hydroxide in the leach liquor. The leach liquor (containing about 132 g./l. $Al_2O_3$) was filtered (and residue washed) at a temperature of 210° F. as rapidly as practical (less than 2 hours) in a vacuum filter. By analysis the filtrate (diluted with wash water) contained 90 g./l. $Al_2O_3$, 57 g./l. $Na_2O$ (fixed), 31 g./l. NaOH, and 10.0 g./l. $Na_2CO_3$ (free). An $Al_2O_3$ recovery of 95% from the soda-sinter product was attained. The washed solid residue of the soda-sinter leach consisted of about 30% $Fe_2O_3$ and 70% $CaCO_3$.

As a further example of the invention, if the crude alumina treated in the foregoing example has become contaminated with a fraction of 1% of silica, it is subjected to a soda-sinter treatment exactly as described in the foregoing example, except that the lime is mixed with the aluminiferous material prior to the sintering operation. The alumina product obtained as a result of leaching the sinter, separating the leach solution from the insoluble sinter residue, and treating the separated solution to precipitate alumina, is essentially silica-free and of the requisite purity to serve as feed to an aluminum reduction pot.

In lieu of adding all the lime to the soda-sinter charge when the crude alumina contains some silica contamination, a portion only of the lime, at least sufficient in amount to form an insoluble complex with the silica present, may be added to such charge, and the remainder necessary for forming the desired amount of sodium hydroxide in the leach solution may be added in the course of the leaching operation.

We claim:

1. The process of producing silica-free alumina from an aluminiferous raw material containing iron and only a very small amount of silica relative to the amount of alumina which comprises preparing a mixture of the aluminiferous material and sufficient sodium carbonate to form sodium aluminate with the alumina therein, incorporating in said mixture an amount of lime greatly in excess of the amount required to form dicalcium silicate with the silica therein, sintering the mixture at a temperature above about 1700° F., thereby converting all the silica and an equivalent portion of the alumina to a calcium aluminum silicate which is substantially completely insoluble in an alkaline aqueous leach solution and converting essentially all the remainder of the alumina to sodium aluminate, leaching the sintered mixture with an aqueous alkaline medium to form a sodium aluminate solution free from silica and iron, and recovering alumina from the resulting leach solution.

2. The process of producing silica-free alumina from an aluminiferous raw material containing iron and only a very small amount of silica relative to the amount of alumina which comprises preparing a mixture of the aluminiferous material and sufficient sodium carbonate to form sodium aluminate with the alumina therein, incorporating in said mixture an amount of lime greatly in excess of the amount required to form dicalcium silicate with the silica therein, the amount of lime being in the range from 0.2 to 0.4 times the amount of aluminiferous material in the mixture, sintering the mixture at a temperature above about 1700° F., thereby converting all the silica and an equivalent portion of the alumina to a calcium aluminum silicate which is substantially completely insoluble in an alkaline aqueous leach solution and converting essentially all the remainder of the alumina to sodium aluminate, leaching the sintered mixture with an aqueous alkaline medium to form a sodium aluminate solution free from silica and iron, and recovering alumina from the resulting leach solution.

3. The process of producing silica-free alumina from an aluminiferous raw material containing iron and only a very small amount of silica relative to the amount of alumina which comprises preparing a mixture of the aluminiferous material and sodium carbonate in excess of the amount required to form sodium aluminate with the alumina therein, incorporating in said mixture an amount of lime greatly in excess of the amount required to form dicalcium silicate with the silica therein, sintering the mixture at a temperature above about 1700° F., thereby converting all the silica and an equivalent portion of the alumina to a calcium aluminum silicate which is substantially completely insoluble in an alkaline aqueous leach solution and converting essentially all the remainder of the alumina to sodium aluminate, leaching the sintered mixture with an aqueous alkaline medium to dissolve substantially all of the sodium aluminate in a silica-free and iron-free leach solution, the excess amounts of sodium carbonate and lime in the mixture prior to sintering being sufficient to form at least about 30 grams per liter of caustic soda in said leach solution, and recovering alumina uncontaminated by silica from the leach solution.

4. The process of producing silica-free alumina from an aluminiferous raw material containing iron and only a very small amount of silica relative to the amount of alumina which comprises preparing a mixture of the aluminiferous material and sodium carbonate in excess of the amount required to form sodium aluminate with the alumina therein, incorporating in said mixture an amount of lime greatly in excess of the amount required to form dicalcium silicate with the silica therein, sintering the mixture at a temperature above about 1700° F., thereby converting all the silica and an equivalent portion of the alumina to a calcium aluminum silicate which is substantially completely insoluble in an alkaline aqueous medium and converting essentially all the remainder of the alumina to sodium aluminate, leaching the sintered mixture with an aqueous medium to dissolve substantially all of the sodium aluminate in a silica-free and iron-free leach solution, the excess amounts of sodium carbonate and lime in the mixture prior to sintering being sufficient to form at least about 30 grams per liter of caustic soda in the leach solution and an equivalent amount of a precipitate of calcium carbonate in intimate admixture with the insoluble residue, filtering the sodium aluminate from the insoluble residue, and recovering alumina uncontaminated by silica from the filtrate.

5. The process of producing silica-free alumina from an aluminiferous raw material containing iron and only a very small amount of silica relative to the amount of alumina which comprises preparing a mixture of the aluminiferous material and sodium carbonate in excess of the amount required to form sodium aluminate with the alumina therein, incorporating in said mixture an amount of lime greatly in excess of the amount required to form dicalcium silicate with the silica therein, the amount of lime being in the range from 0.2 to 0.4 times the amount of aluminiferous material in the mixture, sintering the mixture at a temperature above about 1700° F., thereby converting all the silica and an equivalent portion of the alumina to a calcium aluminum silicate which is substantially completely insoluble in an alkaline aqueous leach solution and converting essentially all the remainder of the alumina to sodium aluminate, leaching the sintered mixture with an aqueous medium to dissolve substantially all of the sodium aluminate in a silica-free and iron-free leach solution, the excess amounts of sodium carbonate and lime in the mixture prior to sintering being sufficient to form from 30 to 50 grams per liter of caustic soda in the leach solution and an equivalent amount of a precipitate of calcium carbonate in intimate admixture with the insoluble residue, filtering the sodium aluminate from the insoluble residue, and recovering alumina uncontaminated by silica from the filtrate.

References Cited in the file of this patent

UNITED STATES PATENTS

| | | |
|---|---|---|
| 2,141,132 | Folger | Dec. 20, 1938 |
| 2,375,342 | Brown | May 8, 1945 |
| 2,398,425 | Haff | Apr. 16, 1946 |
| 2,420,852 | Archibald | May 20, 1947 |
| 2,421,918 | Anderson et al. | June 10, 1947 |
| 2,557,891 | Porter | June 19, 1951 |
| 2,559,653 | Mooney | July 10, 1951 |